July 22, 1952  E. BENOIT  2,604,280
HOLLOW STRUCTURAL ELEMENT FOR VEHICLES AND
MORE ESPECIALLY FOR AIRCRAFT
Filed Nov. 2, 1945  3 Sheets-Sheet 2

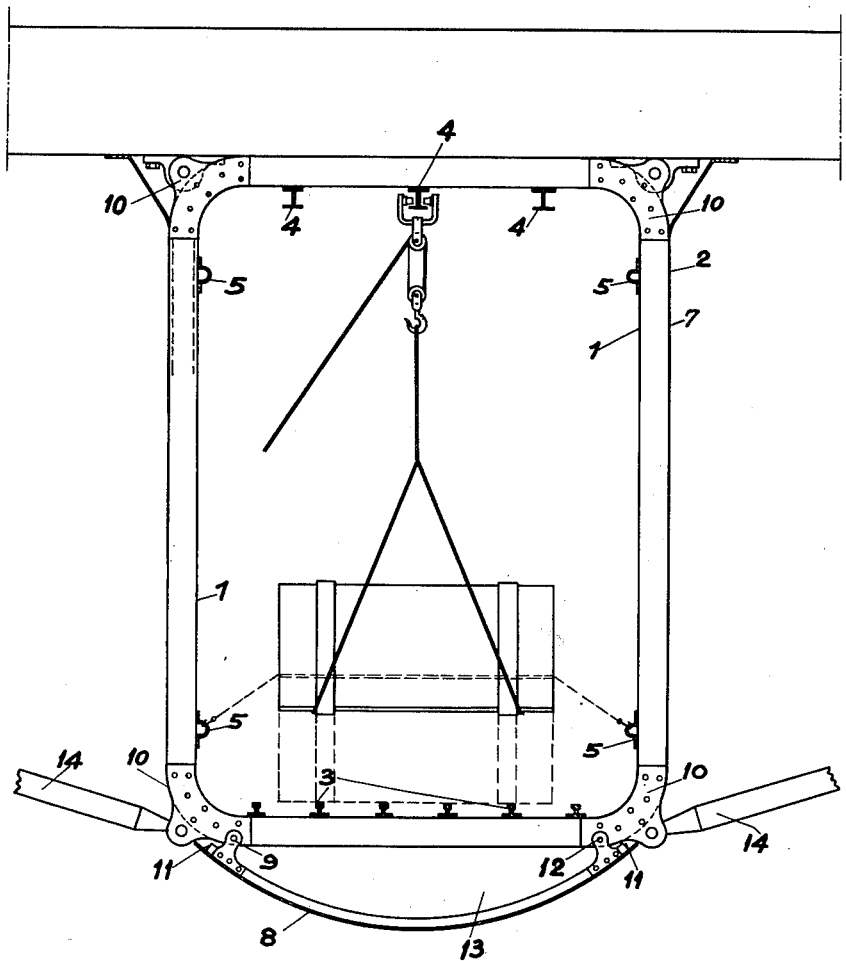

Inventor
EDMOND BENOIT
By
Haseltine, Lake & Co.
Attorneys

Patented July 22, 1952

2,604,280

UNITED STATES PATENT OFFICE 2,604,280

HOLLOW STRUCTURAL ELEMENT FOR VEHICLES AND MORE ESPECIALLY FOR AIRCRAFT

Edmond Benoit, Paris, France, assignor to Societe Anonyme Societe Nationale de Constructions Aeronautiques Du Sud-Est Application November 2, 1945, Serial No. 626,332
In France September 12, 1944

Section 1, Public Law 690, August 8, 1946
Patent expires September 12, 1964

1 Claim. (Cl. 244—119)

The present invention has for its object to provide improved hollow structures particularly adapted to form the hull of an aircraft or the frame-work of a vehicle.

In various branches of the engineering art, the construction of hollow bodies such as the hull of aircraft or the frame-work of vehicles adapted to withstand the various stresses to which they may be subjected, has long formed a standing problem.

One well-known and widely used method of providing such structures is the so-called stressed skin system, wherein a skin is secured over a structure which is usually formed by transversal frames and longitudinal stringers or stiffeners. The skin is always provided outside the transverse frames in order to ensure a regular flow of the air surrounding the hollow body. The stringers generally are on the same side of the skin as are the frames, and this involves the necessity of providing intricate connecting means at the points where the stringers and the transversal frames cross each other.

This solution offered an advantage in that the outer skin combined the function of serving as a resistant element for the hollow structure and the function consisting of ensuring a regular flow of air around the hollow body. Moreover this system was further justified in prior art inasmuch as by arranging the stressed skin outside rather than inside the framework, the moment of inertia was desirably increased.

However the present invention has for main object to provide the reversing of the above-described arrangement and the using of the floor, wall and ceiling structures as stressed skin systems. The stresses are then supported by an inner skin secured to the frame-work, which is formed by successive transverse frames independent from each other, the elements such as stiffeners or stringers for reinforcing such a structure being either inside or outside the inner stressed skin, and the most favorable arrangement being that in which some of said elements are placed inside and some outside said skin. This structure is completed by an outer covering which provides the hollow body with the desired outer shape and ensures regular flow of the air surrounding the hollow body in motion.

Structures according to the present invention offer certain advantages over conventional structures comprising a stressed outer skin system in a number of applications as for example in freight-carrier planes.

In freight-carrier planes, it is necessary to provide within the hull a floor and wall structure capable of withstanding not only the load but also the stresses arising from the attachment and handling of the freight. An inner skin formed by the floor and the walls arranged in this manner is then endowed with a resistance which to a certain extent is superfluous since its action is cumulative with that of the outer stressed skin as at present provided in known structures. It therefore is necessary to provide the outer skin in such a way that it will not only contribute to withstand the stresses to which the hollow body is subjected, and will substantially only fulfil the function which consists of conferring to the hollow body a stream-lined external form or an attractive, artistic or decorative aspect.

While only the case of freight-carrier planes has so far been mentioned by way of example, the present invention is likewise applicable as where the walls of the hollow body are acoustically or thermally isolated, or where the inner skin is to admit flushing with large amounts of water for cleaning purposes or should be capable of being subjected to disinfection.

Another object of the invention is to provide, in a hollow structure of the character described, transverse frames or bulkheads fixedly mounted outwardly of the stressed inner skin and longitudinal stiffeners fitted on said stressed inner skin.

The invention has for other object to provide, in a hollow structure of the character described, longitudinal stiffeners located inwardly the inner stressed skin for performing at the same time guiding and/or supporting and/or stowing functions.

Still a further object of the invention is to provide, in a hollow structure of the character described, an inner stressed skin the cross-section of which is such that the appliance of longitudinal stiffeners is suppressed.

The invention includes within its scope all applications of the above-characterized device; however it contemplates more particularly applications with respect to aircraft, and especially aeroplanes, for the manufacture of hollow elements used in the construction of the same.

The accompanying drawings represent, by way of example only, a form of embodiment relating to such an application, and more particularly to a freight-carrying plane.

Fig. 1 is a cross-section of a fuselage in the region of the wing attachment and wing-bracing attachment members.

Figure 3:
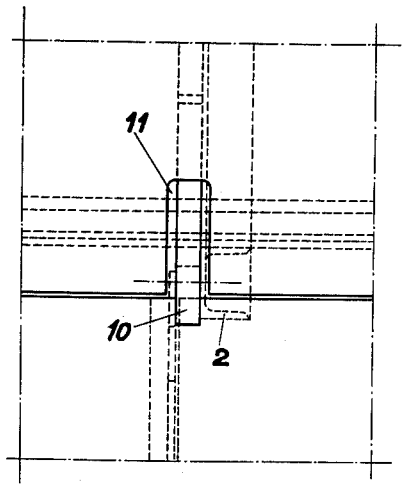
Fig. 3 is a side view from the right of Fig. 2.

The stressed inner skin 1 subjected to elementary tension, compression and shearing stresses for withstanding the global flexion and torsion stresses constitutes a chamber having a rectangular cross-section allowing for a ready arrangement and securing of the freight. Said skin is braced with transverse frames 2, fixed to said skin 1 by any appropriate means suitably spaced along the length of the fuselage, and acting as transverse bulkheads. The section-irons (channel or Z irons) constituting each of the frames 2 are transversely bent in such a way that the web remains in a transversal plane so as to promote fixation by means of bolts of fish-plates 10 connecting the various elements forming the framework and distributing the external stresses throughout the fuselage structure.

Longitudinal stiffeners 5 are inside. The outer covering 7 secured on transverse frame 2 is formed by fabric or by insulating panels, which theoretically are subjected to no other stresses than those resulting from the pressure of outer air. The longitudinal stiffeners 5 disposed along the lateral inner walls of the stressed inner skin 1 are continuous through the desired length; said stiffeners 5 may be eliminated in the event of the constitution of stressed inner skin 1 either by sufficiently thick metal sheets or corrguated metal sheets the undulations of which are disposed to run perpendicularly with respect to frames 2, that is in the same direction as the stiffeners 5 which they are intended to substitute. There are also provided longitudinal stiffeners, located inside the stressed inner skin 1, such as rails 3 and I-shaped girders 4, which serve, besides providing a suitable rigidity to the whole structure, as rails for sliding or rolling the loads along the flooring, or for monorails or other means for hoisting and handling the loads. The stiffeners 3 and 4 having a cross-section corresponding to usual or special types of shaped irons further promote anchorage and support of movable or removable members used for securing the freight or for dividing the same into sections, such as walls, partitions, nets or others, as illustrated in dotted lines on Fig. 1.

The under portion of the fuselage is formed by a stiffened bent panel 8 secured, as by bolts 12 to the transverse frames 2 through readily removable attaching members 9. The space 13 defined between the bottom of the structure and the panel 8 is suitable for housing certain control elements, pipings, electric conductors, etc. which thus are easily accessible for purposes of repair or maintenance. All or part of the landing gear may be accommodated not only in the above-mentioned space 13, but also in the laterally located space defined between the stressed inner skin 1 and the outer covering 7. Said location means are immaterial in the present invention.

The fitting of the struts or braces 14, as well as the upper securing of the wing longerons, are effected through fish-plates 10 bolted to the transverse frames 2 and shaped so as to avoid breaking up the stressed inner skin 1, notches 11 being provided in the outer covering 7 for providing a passage for fish-plates 10 in order that said covering should not be rigid with the stressed members.

The frame-work according to the above description may be further completed by a suitable heat and sound insulating lining, located, as well known in the art, between the stressed inner skin 1 and the outer covering 7.

Figure 2:
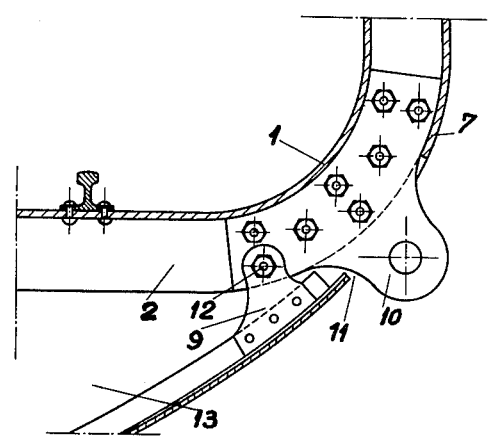
Fig. 2 is an elevational cross-sectional view on an enlarged scale, showing in detail the attachment of a wing-brace.
Figure 4:
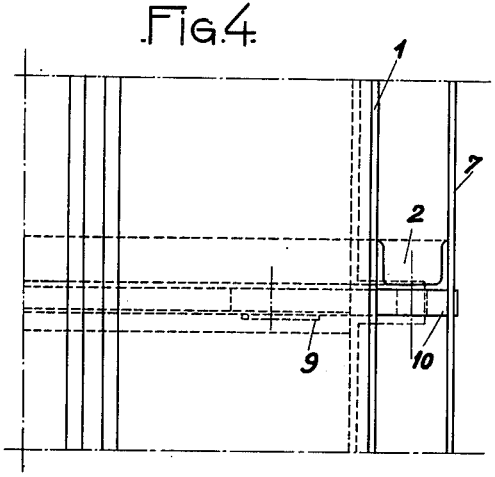
Fig. 4 is a plan view corresponding to Fig. 2.
Figure 5:
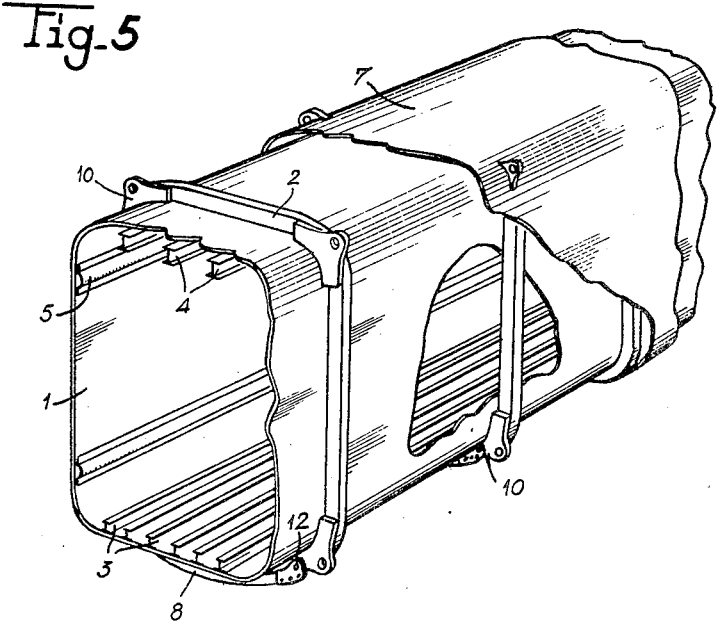
Fig. 5 is a partial perspective view of a hull for aircraft with stiffeners.
Figure 6:
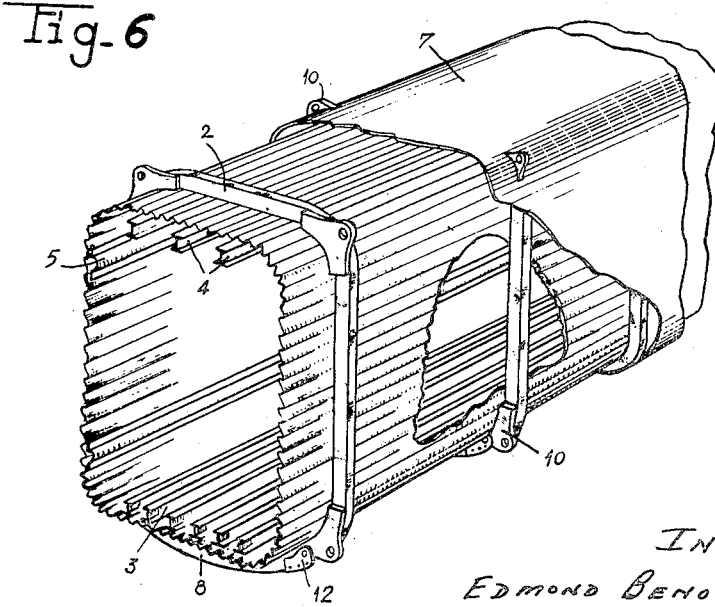
Fig. 6 is a partial perspective view of a hull for aircraft with a corrugated stressed inner skin.

In one modified embodiment, the panels forming the outer covering 7, rather than conforming to the external contour of the transverse frames 2 may be secured to the main frame-work only at a small number of points and may be spaced from said framework by any desired amount between said points. Such an arrangement, as illustrated in Figs. 1 and 2 for the bent panel 8, makes it possible to provide the outer covering with shapes different from those of the stressed inner skin so that the former may be particularly adapted to its main function which is to present minimum drag, as compatible with the most aesthetically desirable shape, while the latter may be given the most favorable shape to provide the greatest possible resistance to stresses applied thereto, for a minimum weight.

Structures of similar designs to the examples described above and which only differ therefrom in structural details, may also be adapted to form other constituent elements of an aircraft, such as stress resistant wing members and tail fin members, or engine-cradle members.

It is to be understood that the embodiment described and illustrated above has been intended solely as an example; the field of application of the invention is considerably more extensive and may be made to include the construction of hulls or bodies of any conveyance.

What I claim as my invention and desire to secure by Letters Patent is:

In a resistant hollow structure adapted in particular to constitute the hull of an aircraft, in combination, a succession of independent parallel transverse frames, a skin secured inside said frames for connecting the same, longitudinal stiffeners secured on the inner face of said skin, whereby said stiffeners and said transverse frames do not intersect each other while participating with said skin in withstanding the stresses applied to said hollow structure, an outer covering which does not participate in withstanding said stresses and only serves to fulfill certain particular requirements such as to confer on said hollow structure a streamlined external shape, and external members with respect to said hollow structure for transmitting the stresses to said structure, said members being directly secured to said transverse frames and extending through apertures formed for that purpose in the outer covering.

EDMOND BENOIT.

REFERENCES CITED

The following references are of record in the file of this patent:

UNITED STATES PATENTS

| Number | Name | Date |
|---|---|---|
| 470,326 | Burton | Mar. 8, 1892 |
| 1,738,670 | Rohrbach | Dec. 10, 1929 |
| 1,793,118 | Moores | Feb. 17, 1931 |
| 1,797,657 | Hall | Mar. 24, 1931 |
| 1,860,076 | Collison | May 24, 1932 |
| 1,885,406 | Bechereau | Nov. 1, 1932 |
| 2,310,765 | Dornier | Feb. 9, 1943 |
| 2,362,951 | Wallis | Nov. 14, 1944 |
| 2,392,789 | Watter | Jan. 8, 1946 |
| 2,404,195 | Schlieben | July 16, 1946 |

FOREIGN PATENTS

| Number | Country | Date |
|---|---|---|
| 663,016 | France | Mar. 29, 1929 |